United States Patent [19]

Kohlmayr et al.

[11] 4,163,811

[45] Aug. 7, 1979

[54] METHOD OF FABRICATING A FUEL CELL ELECTRODE

[75] Inventors: Gerda M. Kohlmayr, Glastonbury; Paul Stonehart, Madison, both of Conn.

[73] Assignee: United Technologies Corporation, Hartford, Conn.

[21] Appl. No.: 895,162

[22] Filed: Apr. 10, 1978

Related U.S. Application Data

[63] Continuation-in-part of Ser. No. 809,838, Jun. 24, 1977, abandoned, which is a continuation of Ser. No. 696,334, Jun. 15, 1976, abandoned.

[51] Int. Cl.$^2$ .................. H01M 4/88; H01M 4/92; H01M 4/96; B01J 23/40
[52] U.S. Cl. ...................... 427/115; 252/182.1; 252/425.3; 252/430; 427/125; 429/42
[58] Field of Search ............ 427/115, 125; 429/42; 252/425.3, 430, 447, 182.1, 326, 511; 210/51, 52; 264/105, 122

[56] References Cited

U.S. PATENT DOCUMENTS

| | | | |
|---|---|---|---|
| 3,248,267 | 4/1966 | Langer et al. | 429/42 |
| 3,444,004 | 5/1969 | Smith | 429/42 |
| 3,467,554 | 9/1969 | Forten et al. | 429/42 |
| 3,510,356 | 5/1970 | Richman | 429/42 |
| 3,533,851 | 10/1970 | Adlhart | 427/115 |
| 3,600,230 | 8/1971 | Stachurski et al. | 429/42 |
| 3,635,763 | 1/1972 | Niedrach et al. | 429/42 |
| 3,676,222 | 7/1972 | Deibert | 429/42 |
| 4,043,933 | 8/1977 | Breault et al. | 252/182 |
| 4,058,482 | 11/1977 | Baris et al. | 252/425.3 |

OTHER PUBLICATIONS

Journal of Physical Chemistry –"Dispersal of Cabon Blacks to Individual Crystallites", K. J. Notz–vol. 71, No. 6 (5/1967), pp. 1965-1966.

*Primary Examiner*—P. E. Konopka
*Attorney, Agent, or Firm*—Stephen E. Revis

[57] ABSTRACT

Electrocatalyst and hydrophobic polymer particles are combined to form an aqueous suspension which is then applied to a conductive substrate to form an electrode. The colloidal chemistry of the suspension of electrocatalyst particles and hydrophobic polymer particles is controlled prior to the application of the suspension to the substrate such as by the incorporation of a sol of a polyvalent metal oxide or solution of a salt of a polyvalent metal into the suspension.

15 Claims, No Drawings

METHOD OF FABRICATING A FUEL CELL ELECTRODE

This application is a continuation-in-part of application Ser. No. 809,838 filed on June 24, 1977 now abandoned, which, in turn, was a continuation of U.S. Patent Application Ser. No. 696,334, filed on June 15, 1976, now abandoned.

BACKGROUND OF THE INVENTION

1. Field of the Invention

This invention relates to a process for the construction of electrodes for use in an electrochemical device.

2. Description of the Prior Art

The advantages of lightweight electrodes for use in fuel cells have been recognized. These electrodes essentially comprise an admixture of electrocatalyst and hydrophobic binder deposited on a substrate material such as a porous carbon or metal support, wire mesh or grid. The electrodes are extremely thin, having low internal electrical resistance and furthermore, take up only limited space permitting the construction of highly compact cells having a high energy to volume and energy to weight ratio. One difficulty with these electrodes, however, is obtaining a controlled distribution of electrocatalyst particles with the hydrophobic polymer particles throughout the electrode structure. The performance of polytetrafluoroethylene (PTFE) bonded platinum black and platinum supported on carbon fuel cell electrodes is limited by the size of the effective catalyst clusters interspersed in the porous gas diffusion electrode structure. The effective size of the catalyst clusters (i.e., "agglomerates") between the gas diffusion channels maintained by the dispersed PTFE is usually large; therefore, utilization of the catalyst in the interior of the electrolyte filled catalyst agglomerate requires the molecules of gaseous reactant to travel a long diffusion path.

Conventional methods for dispersing the electrocatalyst particles, such as fluid energy milling, ball milling, ultrasonic agitation, and the addition of non-ionic surfactants, have been generally unsuccessful in sufficiently reducing the effective catalyst agglomerate size, so that the catalyst agglomerate in prior art fuel cell electrode structures ranges between $1 \times 10^{-6}$ and $20 \times 10^{-6}$ m. This is considered too large.

SUMMARY OF THE INVENTION

It is proposed to overcome the deficiencies of the prior art methods of constructing lightweight electrocatalyst/hydrophobic polymer electrodes by carefully controlling the colloid chemistry of an aqueous suspension of electrocatalyst particles and hydrophobic polymer particles prior to the application of the suspension to a conductive substrate, by introducing into the suspension a sol of a polyvalent metal oxide or salt solution of a polyvalent metal to adjust the surface charges and thence the interactions between the electrocatalyst particles themselves and between the electrocatalyst particles and the hydrophobic polymer. More particularly, according to the present invention a separate aqueous suspension of electrocatalyst particles and a separate aqueous suspension of hydrophobic polymer particles are mixed to form a combined suspension, which also includes a sol of a polyvalent metal oxide or salt solution of a polyvalent metal. The sol or salt solution is introduced into the combined suspension either as part of the separate aqueous suspension of electrocatalyst particles or after the separate suspensions have been combined. To work properly the valency of the metal of the sol or salt solution must be three or greater. The charged metal oxide particles if the sol is used or the metal cations from the salt solution adsorb on the high surface area catalyst particles and prevent massive agglomeration of the electrocatalyst. Electrodes fabricated using this catalyst/polymer suspension have an improved electrochemical performance and improved reliability of construction, which means a higher yield of acceptable electrodes.

It is not clear exactly what occurs in the fabrication of the electrodes as a result of modifying the colloid interactions of the component particles prior to deposition. It is theorized, however, that by modifying the colloid interactions—i.e., by adjusting the surface charges of the electrocatalyst particles and hydrophobic polymer particles—the zeta potentials of the suspended particles are altered, thereby altering interaction between them. The modification of colloid interaction can be accomplished with most polyvalent metals, such as $Th^{4+}$, $Zr^{4+}$, $Al^{3+}$, $Fe^{3+}$, $Ce^{3+}$, or the like. The valency must be at least $3+$. Valencies of $2+$ do not seem to retard the agglomeration sufficiently. Cationic organic surfactants may also accomplish the same results, and, although not preferred, are contemplated as being within the scope of the present invention. One possible organic surfactant is Hyamine 1622 from Rohm and Haas, Philadelphia, Pennsylvania, which is a diisobutylphenoxy ethoxy ethyl dimethyl benzyl ammonium chloride.

The foregoing and other objects, features, and advantages of the present invention will become more apparent in light of the following detailed description of preferred embodiments thereof.

DESCRIPTION OF PREFERRED EMBODIMENTS

In carrying out a preferred embodiment of the invention, proper amounts of polymer and electrocatalyst are conveniently formed into separate aqueous suspensions using colloidal hydrophobic polymer particles and electrocatalyst particles. In one construction the electrocatalyst comprises an electrocatalytic metal on carbon particles. The weight of the metal catalyst may be anywhere from 1 to 20% of the total electrocatalyst weight but is preferably 5 to 10% of the electrocatalyst weight. The electrocatalyst/polymer admixture will contain from about 70–40 weight percent electrocatalyst and from about 30–60 weight percent polymer. Preferably the electrocatalyst will comprise 45–55 weight percent of the admixture and the polymer will comprise 55–45 weight percent. The foregoing percentages are based upon experience with a platinum supported on carbon electrocatalyst and PTFE polymer; however, the suggested ratios of electrocatalyst to polymer would also apply if unsupported platinum black were used as the electrocatalyst.

A polyvalent metal is added to the electrocatalyst suspension in the form of either a sol of a polyvalent metal oxide or a solution of a salt of a polyvalent metal. The concentration of the metal oxide in the sol and the concentration of the metal cation in the salt solution is preferably on the order of $10^{-2}$ to $10^{-7}$ M. A salt solution is preferred. The suspension of electrocatalyst with the polyvalent metal is then combined with the PTFE suspension and stirred. It is desirable, although not always required, to adjust the pH of the electrocatalyst suspension after adding the polyvalent metal to produce maximum dispersion of the electrocatalyst. This procedure simply gives another element of control. The proper pH is determined by the nature of the electrocatalyst and polyvalent metal to be added. For example, if the electrocatalyst is platinum black or platinum supported on carbon, the polymer PTFE, and the polyvalent metal Thorium, the pH of the electrocatalyst suspension should be adjusted to between 9.0 and 10.0; if the electrocatalyst is platinum supported on carbon, the polymer PTFE, and the polyvalent metal Iron, the pH of the electrocatalyst suspension should be adjusted to between 2.5 and 5.0; if the electrocatalyst is platinum supported on carbon, the polymer PTFE, and the polyvalent metal Aluminum, the pH of the electrocatalyst suspension should be adjusted to between 3.5 and 6.5. In the case of the salt solution it is possible that the polyvalent metal in solution is hydrated or solvated and that this species (oxy-hydrate or hydroxide) controls the colloid chemistry; it may be that the optimum pH for any particular combination is the pH at which an aqueous solution permits the formation of the hydrated metal ion; this pH can readily be determined by trial and error by a person having ordinary skill in the art.

After the two suspensions are combined and stirred, a catalyst/polymer composite layer is formed by applying the suspended solids to a suitable conductive substrate such as a porous metal or carbon substrate, or a wire grid or mesh by any of various techniques including filtration, spraying, or by forming a paste or the like and applying the paste to the substrate with a flat knifelike surface, doctor blade, or similar means. As a result of the process of this invention, the maximum effective catalyst agglomerate size is usually about $1.0 \times 10^{-6}$ m. Preferably, the electrode is heated in air or oxygen to a temperature sufficient to remove any organic surfactant which may be in the suspensions and to bond the electrocatalyst and polymer particles to each other and to the substrate. Since the bonding temperature of the polymer is always sufficiently high to volatilize or decompose the surfactant, this can be accomplished in a single step. The bonding temperature of polytetrafluoroethylene is, for example, about 320° C. The electrocatalyst/polymer composite preferably will be applied to the support at a catalyst loading of from about 0.05 mg metal per cm² up to about 10 mg metal per cm². Normally, as low an electrocatalyst loading as possible for any particular application is desired due to the expense of the catalyst. It is possible to use catalyst loadings outside of the above range up to as high as about 35 mg metal per cm² of electrode surface and higher, but normally this is not necessary or desirable. In accordance with the present invention, the amount of electrocatalyst utilized can be lowered due to the uniform distribution of electrocatalyst and as a result of the improved utilization characteristics of the electrode.

Some substrates particularly useful herein are metal screens, expanded metal, porous sinters of carbon or metal, metal felt, or mesh. It is essential that the structure be electrically conductive and able to withstand the corrosive environment of a fuel cell. Suitable metal supports are from about 0.5 to 1.0 mm thick having a high porosity, i.e., from 35 to 90%, and preferably are composed of nickel, copper, iron, titanium, tantalum, silver, gold, and alloys thereof, primarily from the standpoint of the exceptional resistance of these metals to the corrosive environment in the fuel cell.

The polymer which is to be utilized in accordance with the present invention must be relatively hydrophobic. Exemplary polymers include polytetrafluoroethylene, polyfluoroethylenepropylene, polytrifluorochloroethylene, polyvinylfluoride, perfluoroalkoxypolyethylene, polyvinylidene fluoride, polytrifluoroethylene, and co-polymers thereof. However, because of its exceptional hydrophobicity as well as its resistance to heat and the corrosive environment of the electrolyte, polytetrafluoroethylene is presently preferred.

The electrochemically active metal which is to be applied to the metal support as a suspension with the hydrophobic polymer can be any of various metals which will favorably influence an electrochemical reaction. Such metals include nickel, cobalt, iron, gold, copper, silver, palladium, platinum, ruthenium, osmium, and iridium, alloys and oxides thereof. Due to their exceptional properties insofar as favorably influencing an electrochemical reaction, the Group VIII and Ib metals of Mendeleyev's periodic table are preferred. The most desirable metal is platinum.

The electrodes prepared by the process of the present invention can be employed in various types of fuel cells including those using alkaline and acid electrolytes. Alkaline electrolytes are preferably the alkaline metal hydroxides but can include the alkaline earth hydroxides as well as the alkaline earth carbonates. Preferred alkaline electrolytes are potassium, sodium, rubidium, and cesium hydroxides. The strong mineral acids such as phosphoric acid, sulfuric acid, and hydrochloric acid and organic acids such as trifluoromethanesulfonic acids or polymers thereof are the preferred acid electrolytes. Preferably the electrodes are employed in acid or alkaline electrolyte fuel cells wherein the electrolyte may be trapped or contained in a hydrophilic matrix; however, they could also be used in cells operating with a free electrolyte. Such cells are normally operated from ambient to about 220° C. using oxygen or air as the oxidant, and hydrogen or hydrocarbons as the fuel.

The following specific examples are illustrative of this invention:

EXAMPLE I

A catalyst comprising 5 weight percent platinum supported on graphitized Vulcan ® XC-72 ® (a furnace black from Cabot Corporation, Boston, Mass. is suspended by ultrasonic vibration in a quantity of six times distilled (6D) water (K ≃ $1 \times 10^{-6}$) sufficient to give a catalyst concentration of $1 \times 10^{-4}$ g/ml. To this suspension is added $Fe^{3+}$ ions from an $Fe_2(SO_4)_3$ solution which is 0.01 M in $Fe^{3+}$, such that the ratio, by weight, of $Fe^{3+}$ to catalyst is $6.6 \times 10^{-2}$. The pH of the suspension is raised to 3.4 by adding 0.1 N NaOH dropwise. The resulting suspension is stirred vigorously to aid in agglomerating the catalyst and is then filtered through 0.45μ Millipore ® filter paper. The filtered material is washed with 6D water to remove any excess salts and is then resuspended (while still damp) by ultrasonic agitation for five minutes in the same volume of 6D water as used in the first suspension of the catalyst. The step of removing the excess salts may not be required when the electrode is to be used in a phosphoric acid cell since the salts will be dissolved naturally by the acid. After removing from the agitator, TFE-42 (a PTFE aqueous suspension from Dupont Corporation, Delaware, Maryland) is added dropwise, while stirring, so as to give a one to one ratio, by weight, of catalyst to PTFE. The catalyst/PTFE suspension is filtered onto 0.45μ Millipore filter paper. Using this filtered catalyst/PTFE mixture an electrode is prepared as follows: A mixture of 80 weight percent TFE-42 and 20 weight percent graphitized Valcan XC-72 ® is suspended in water and filtered on top of this catalyst/PTFE mixture to form a porous conductive substrate. While still damp and on the filter paper, the filter cake is pressed at 300 psi into a 50 mesh gold plated tantalum screen using absorbent paper to absorb the water squeezed out of the damp filter cake. The layer is dried in air at about 50°–70° C., and then sintered at 335° C. to form the finished electrode.

The performance of two electrodes (designated A and B) made in accordance with the procedure of Example I is shown in Table 1. These electrodes had a catalyst loading of 0.5 mg Pt/cm$^2$ and were run in half cell tests using pure oxygen and 96 weight percent $H_3PO_4$ as the electrolyte. The operating temperature of the cells was 160° C.

TABLE 1

ELECTRODE PERFORMANCE

| Electrode Current Density (ma/cm$^2$) | Electrode Potential vs. H$_2$ Reference Electrode in the Same Electrolyte (volts) | |
|---|---|---|
| | A | B |
| 1000 | .44 | .57 |
| 500 | .56 | .62 |
| 300 | .61 | .65 |
| 100 | .69 | .71 |
| 50 | .73 | .74 |

EXAMPLE II

Electrodes having good performance characteristics were also made by the procedure of Example I except the catalyst used consisted of 5 weight percent platinum supported on non-graphitized Vulcan XC-72 ®.

EXAMPLE III

Electrodes were made using the same procedure as Example I except that instead of adding $Fe^{3+}$ ions from an iron salt solution, $Th^{4+}$ ions were added from a solution of $Th(NO_3)_4$ solution which was 0.01 M in $Th^{4+}$, such that the ratio of $Th^{4+}$ to catalyst, by weight was 0.22; the resulting suspension was raised to a pH value of 7.5 (instead of 3.4) by adding 0.1 N NaOH dropwise.

Table 2 gives performance data of electrodes C and D made according to the procedure of this example under the same test conditions used with the electrodes of Table 1. Electrode C had a catalyst loading of 0.05 mg Pt/cm$^2$ and electrode D had a platinum loading of 0.1 mg Pt/cm$^2$.

TABLE 2

ELECTRODE PERFORMANCE

| Electrode Current Density (ma/cm$^2$) | Electrode Potential vs. H$_2$ Reference Electrode in the Same Electrolyte (volts) | |
|---|---|---|
| | C | D |
| 1000 | .53 | .49 |
| 500 | .60 | .59 |
| 300 | .66 | .65 |
| 100 | .71 | .71 |
| 50 | .74 | .75 |

In the foregoing examples the sol or salt solution was added to an aqueous suspension of electrocatalyst particles before combining the electrocatalyst suspension with the polymer suspension. An alternate and equally useful embodiment is described in the following Example IV wherein the polyvalent metal is added after the suspensions of electrocatalyst and polymer are combined.

EXAMPLE IV

A catalyst consisting of 15 weight percent platinum on non-graphitized Valcan XC-72 ® is added to a beaker containing an aqueous suspension of 0.4 mg/ml TFE-42 such that the total weight of the PTFE equals the weight of catalyst. The catalyst and PTFE are then suspended by ultrasonic agitation. The suspension is heated to about 50°–70° C., and then $Al^{3+}$ ions, in the form of an $Al_2(SO_4)_3$ solution, is added dropwise until 10 mg $Al^{3+}$ has been added for every 6 mg electrocatalyst. This suspension is heated for about two hours, making sure to maintain the volume by adding water occasionally. The suspension is then cooled and resuspended by ultrasonic agitation. The resuspension is then filtered onto a 0.45μ Millipore filter paper as was the resuspension of Example I. From this point on the procedure for forming finished electrodes is the same as the procedure of Example I. Electrodes designated E and F were made by this procedure. Their performance characteristics are shown in Table 3.

An electrode designated G was also made by this procedure except that the step of adding $Al^{3+}$ ions was eliminated for the purpose of comparison. The performance data for electrode G is also shown in Table 3. All electrodes of Table 3 had a platinum loading of 0.05 mg Pt/cm$^2$ and were tested under the same conditions as the electrodes of Tables 1 and 2.

TABLE 3

ELECTRODE PERFORMANCE

| Electrode Current Density (ma/cm$^2$) | Electrode Potential vs. H$_2$ Reference Electrode in the Same Electrolyte (volts) | | |
|---|---|---|---|
| | E | F | G |
| 1000 | .62 | .62 | .56 |
| 500 | .66 | .66 | .62 |
| 300 | .68 | .69 | .65 |
| 100 | .73 | .72 | .70 |
| 50 | .76 | .75 | .74 |

In yet another embodiment, exemplified by the following Examples V and VI, the sol or salt solution is used as the aqueous suspending medium for the electrocatalyst particles which are added thereto as a powder to form the electrocatalyst suspension. The electrocatalyst suspension is then mixed with a hydrophobic polymer suspension in a manner similar to Example I.

EXAMPLE V

A thorium oxide ($ThO_2$) sol is prepared by peptizing $ThO_2$ powder having a surface area of 80–90 m$^2$/g in dilute aqueous $HNO_3$ at a pH value of from 3 to 3.5 for one hour at 80° C. The concentration of $ThO_2$ in the sol should be between 0.05–5.0 mg/ml. Twenty-five mg of a platinum black having a surface area of from 20–40 m$^2$/g, is mixed with 4.6 ml of the $ThO_2$ sol to form a suspension. This suspension is blended with the 45 ml dilute $HNO_3$ at a pH value of from 3–4 and is ultrasonically dispersed; it is then mixed with a TFE-42 suspension having a ratio of PTFE to platinum, by weight, of 0.1. This suspension is formed into an electrode by applying it to a conductive carbon substrate. The electrode layer is dried at 50°–70° C. and is then heated at 350° C. for ten minutes.

The performance of an electrode H made in accordance with the procedure of this example and having a platinum loading of 0.5 mg Pt/cm$^2$ was tested under the same test conditions used with the electrodes of Table 1. Performance data for this electrode is given in Table 4.

TABLE 4

ELECTRODE PERFORMANCE

| Electrode Current Density (ma/cm$^2$) | Electrode Potential vs. H$_2$ Reference Electrode in the Same Electrolyte (volts) H |
|---|---|
| 200 | .74 |
| 100 | .77 |
| 50 | .81 |
| 20 | .86 |
| 10 | .89 |

EXAMPLE VI

Electrodes similar to those of Example V may also be prepared using ZrO$_2$ powder to form a zirconium oxide sol which is then formed into an electrode by the same procedure as Example V.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. The method of constructing a fuel cell electrode comprising the steps of:
    forming an aqueous suspension of electrocatalyst particles;
    adding a sol of a polyvalent metal oxide or solution of a salt of a polyvalent metal to said aqueous suspension, the valency of the metal of said sol or solution of said salt being 3 or greater, and the concentration of the metal oxide in the sol or the concentration of the metal cation in the salt solution is on the order of 10$^{-2}$ to 10$^{-7}$ M;
    forming a separate aqueous suspension of colloidal hydrophobic polymer particles;
    combining said aqueous suspensions forming a uniform aqueous suspension of electrocatalyst particles and hydrophobic polymer particles; and
    fabricating said electrocatalyst particles and polymer particles into a fuel cell electrode.

2. The method of constructing a fuel cell electrode according to claim 1 including the step of adjusting the pH of the aqueous suspension of electrocatalyst particles after the step of adding said sol of a polyvalent metal oxide or solution of a salt of said polyvalent metal thereto to produce maximum dispersion of the electrocatalyst particles in the suspension.

3. The method of constructing a fuel cell electrode comprising the steps of:
    combining an aqueous suspension of electrocatalyst particles and an aqueous suspension of colloidal hydrophobic polymer particles to form a uniform aqueous suspension of electrocatalyst particles and hydrophobic polymer particles and adding a sol of a polyvalent metal oxide or solution of a salt of a polyvalent metal to said combined aqueous suspension to modify the colloid interaction of the electrocatalyst and hydrophobic polymer particles, the valency of the metal of said sol or solution of said salt being 3 or greater, and the concentration of the metal oxide in the sol or the concentration of the metal cation in the salt solution is on the order of 10$^{-2}$ to 10$^{-7}$ M; and
    fabricating said electrocatalyst particles and polymer particles into a fuel cell electrode.

4. The method according to claim 1 wherein said metal is selected from the group consisting of thorium, zirconium, aluminum, iron, and cerium.

5. The method according to claim 1 wherein said electrocatalyst particles are platinum supported on carbon, and said hydrophobic polymer particles are polytetrafluoroethylene.

6. The method according to claim 1 wherein said electrocatalyst particles are unsupported platinum black, and said hydrophobic polymer particles are polytetrafluoroethylene.

7. The method of constructing a fuel cell electrode comprising the steps of:
    forming an aqueous suspension of either platinum supported on carbon electrocatalyst particles or unsupported platinum black electrocatalyst particles;
    forming an aqueous suspension of colliodal hydrophobic polymer particles;
    adding a polyvalent metal to the electrocatalyst suspension in the form of a sol of a polyvalent metal oxide or solution of a salt of the polyvalent metal, wherein said metal has a valency of 3 or greater and is selected from the group consisting of thorium, zirconium, aluminum, iron, and cerium, and the concentration of the metal oxide in the sol or the concentration of the metal cation in the salt solution is on the order of 10$^{-2}$ to 10$^{-7}$ M;
    adjusting the pH of the electrocatalyst suspension after adding the sol or solution of the salt to produce maximum dispersion of the electrocatalyst particles in the suspension;
    combining said aqueous suspensions to form a uniform aqueous suspension of electrocatalyst particles and hydrophobic polymer particles; and
    fabricating said electrocatalyst particles and hydrophobic polymer particles into a fuel cell electrode including the step of applying said particles to a conductive substrate to form a catalyst/polymer layer on said substrate and heating said electrode to sinter the catalyst/polymer layer.

8. The method according to claim 7 wherein the polyvalent metal is added in the form of a salt.

9. The method according to claim 8 wherein the polyvalent metal is Aluminum.

10. The method according to claim 8 wherein the polyvalent metal is Iron.

11. The method according to claim 8 wherein the polyvalent metal is Thorium.

12. The method of constructing a fuel cell electrode comprising the steps of:
    A. forming an aqueous suspension of electrocatalyst particles;
    B. forming a separate aqueous suspension of colloidal hydrophobic polymer particles;

C. combining said aqueous suspensions of steps (A) and (B) to form a uniform aqueous suspension of electrocatalyst particles and hydrophobic polymer particles, said combined suspension including a sol of a polyvalent metal oxide or a solution of a salt of a polyvalent metal, the valency of the metal of said sol or solution of said salt being 3 or greater, and the concentration of the metal oxide in the sol or the concentration of the metal cation in the salt solution is on the order of $10^{-2}$ to $10^{-7}$ M, and wherein said sol or solution of said salt is incorporated into said combined suspension either as a part of the suspension of step (A) or after the suspensions of steps (A) and (B) have been combined; and D. fabricating said electrocatalyst particles and polymer particles into a fuel cell electrode.

13. The method of constructing a fuel cell electrode according to claim 12 wherein step A comprises forming a separate aqueous suspension of electrocatalyst particles including either said sol of a polyvalent metal oxide or said solution of a salt of a polyvalent metal.

14. The method of constructing a fuel cell electrode according to claim 13 wherein step A comprises adding electrocatalyst particles to either said sol of a polyvalent metal oxide or to said solution of a salt of a polyvalent metal to form said aqueous suspension of electrocatalyst particles.

15. The method of constructing a fuel cell electrode according to claim 14 wherein said electrocatalyst particles are platinum particles.

* * * * *

UNITED STATES PATENT AND TRADEMARK OFFICE
CERTIFICATE OF CORRECTION

PATENT NO. : 4,163,811
DATED : August 7, 1979
INVENTOR(S) : GERDA M. KOHLMAYR and PAUL STONEHART It is certified that error appears in the above—identified patent and that said Letters Patent are hereby corrected as shown below:

Column 4, line 45 "Vulcan® XC-72®" should be

--Vulcan® XC-72R--

Column 5, line 4 "Valcan XC-72®" should be --Vulcan XC-72R--

Column 5, line 37 "Vulcan XC-72®" should be --Vulcan XC-72R--

Column 6, line 10 "Valcan XC-72®" should be --Vulcan XC-72R--

Signed and Sealed this

Twenty-fifth Day of December 1979

[SEAL]

Attest:

SIDNEY A. DIAMOND

Attesting Officer

Commissioner of Patents and Trademarks